Sept. 25, 1934. F. L. DODGSON Re. 19,323
RAILWAY TRAFFIC CONTROLLING SYSTEM
Original Filed Oct. 3, 1928
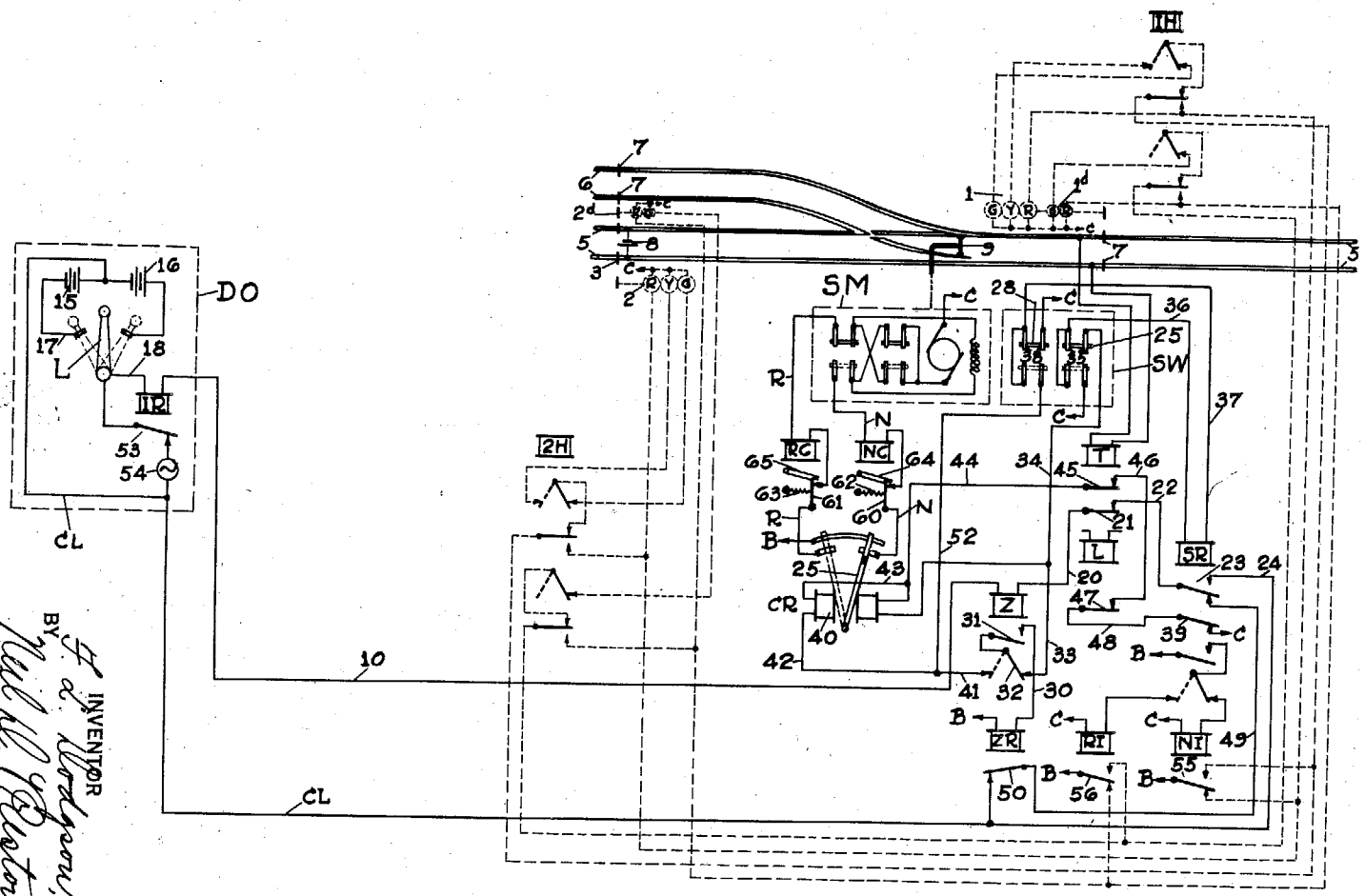
INVENTOR
F. L. Dodgson,
BY
Neil H. Preston,
his ATTORNEY Reissued Sept. 25, 1934

Re. 19,323

UNITED STATES PATENT OFFICE 19,323

RAILWAY TRAFFIC CONTROLLING SYSTEM

Frank L. Dodgson, Rochester, N. Y., assignor to General Railway Signal Company, Rochester, N. Y.

Original No. 1,794,595, dated March 3, 1931, Serial No. 310,095, October 3, 1928. Application for reissue October 11, 1932, Serial No. 637,360

26 Claims. (Cl. 246—3)

This invention relates to a system for controlling distant switch machines and the signals associated therewith, and for receiving indications as to the response of the switch machine to such control, and receiving indications of the passage of trains by the switch controlled by such switch machine.

Although the present invention may be applied to a single siding end, it may comprise a part of a train dispatching system in which train movements are dispatched by wayside signal indications.

In accordance with the present invention it is proposed to use a single line circuit for controlling a distant switch machine and the signals associated therewith, to continuously indicate over this same line circuit the condition of occupancy of a detector track circuit associated with such switch, and for giving a continuing but distinctive indication so long as the switch machine is assuming an intermediate position.

Other objects, purposes and characteristic features of the present invention will be in part apparent from the accompanying drawing, to those skilled in the art of railway signaling, and will in part be apparent from the following description.

In describing the invention in detail reference will be made to the accompanying drawing which illustrates conventionally a system embodying the present invention.

Referring to the accompanying drawing, the main track of a railway system has been illustrated by rails 5 and a siding of said system has been illustrated by rails 6, of which the usual detector track circuit is insulated from the rest of these rails by insulating joints 7, this detector track circuit including the usual track battery 8 and a detector track relay T. The main starting signal is designated 2 and the dwarf starting signal is designated $2^d$; whereas the main entering signal is designated 1 and the take siding signal is designated $1^d$. Although these signals have been illustrated as comprising two and three aspect light signals, semaphore signals or any other type of signal may be used instead.

The side track 6 is connected to the main track 5 through the track switch 9. This track switch 9 is operated by a switch machine conventionally shown by a dotted rectangle SM, and associated therewith is a switch box SW the contacts of which are operated in response to movement of the points of switch 9. This switch machine in the particular arrangement shown is controlled by a two-position controller CR of the frictional, or toggle stick type, which controller CR is controlled by the control relay Z controlled by the lever L in the distant dispatcher's office, or tower, DO through the medium of line wire 10 and common return wire CL. The normal and reverse circuits of this switch machine also include respectively the cut-out relays NC and RC.

The apparatus also includes an approach locking relay L which prevents operation of a switch machine in the face of an approaching train, a polar signal relay SR which may assume an energized position depending on the position of the contacts in the switch box SW and on the position of the control relay Z, so that the switch machine and control relay Z must assume corresponding positions in order to permit clearing of this signal relay SR, the apparatus also including a flashing relay ZR and normal and reverse indicating relay NI and RI, respectively.

It is believed that the functioning of the system is most readily explained by discussing the operation thereof.

*Operation*

Let us assume that the operator wishes to operate the track switch 9 to the reverse, or take-siding, position. In order to do so the operator will move the lever L into the left hand dotted position in which the following circuit for the control relay Z is completed:—starting at the battery 15, wire 17, lever L, wire 18, winding of the indicating relay IR, line wire 10, winding of the control relay Z, wire 20, front contact 21 of the detector track relay T, wire 22, contact 23 of the signal relay SR in its deenergized position, wire 49, back contact 50, to common return wire CL connected to the other side of battery 15. With this circuit completed the control relay Z assumes its dotted energized position, in which it closes the energizing circuit for the left hand coil of the controller CR, which may be traced as follows:—beginning at the terminal B of a suitable battery, winding of the flashing relay ZR, wire 30, contacts 31 and 32 of the relay Z, wires 41 and 42, coil 40 of the relay CR, wires 43 and 44, front contact 45 of the track relay T, wire 46, front contact 47 of the approach locking relay L, wire 48, back contact 39 of the relay SR, to the other terminal C of such battery.

As the polar contact of the control relay Z swings from its right hand to its left hand position it opens the energizing circuit for signal relay SR at the polar contact 32, which circuit was formerly open at the neutral contact 31, and can be traced as follows:—beginning at the terminal B of a suitable source of current, winding of flashing relay ZR, wire 30, neutral contact 31 of control relay Z, polar contact 32 of this relay which when last energized was energized to the right hand position, wires 33 and 34, contacts 25—35 of the switch box SW, wire 36, winding of the relay SR, wire 37, switch box contacts 28—38, to common return wire C connected to the other side of said source of energy.

It is thus seen that the picking up of the relay Z will not effect picking up of the relay SR, unless the relay Z and the switch machine SM assume corresponding positions. Further, the picking up of the relay Z will cause the flashing relay ZR to pick up unles either the track relay T or the approach locking relay L are deenergized; and that with the relay Z energized and the relay SR deenergized the picking up of the relay ZR will open the energizing circuit for the relay Z, thereby again effecting deenergization of the relay ZR and completion of the circuit of the relay Z, so that the relays Z and ZR will be intermittently energized, this by reason of the fact that relay ZR repeats the relay Z and its back contacts 50 is included in the energized circuit of the relay Z.

This energization of coil 40 of controller CR operates the armature 25 thereof to its left hand dotted position, in which position it is held by suitable toggle means and completes the reverse circuit R for the switch machine SM, thus causing operation of the track switch 9 to the take-siding position by this switch machine.

Not only does the signal relay SR when assuming its deenergized position close the contact 39 and permit the control of controller CR, but it also drops contact 23, thereby carrying the control circuit for the control relay Z through wire 49 and back contact 50 of the flashing relay ZR. Since the flashing relay ZR is energized it being connected in series with the coil 40 of the controller CR the energizing circuit for the control relay Z is broken at this back contact 50 of the relay ZR as soon as this relay ZR picks up. This breaking of the line circuit including the control relay Z causes deenergization of the indicating relay IR in the dispatcher's office DO, thereby causing closure of its back contact 53 and effecting illumination of the indicating lamp 54 through a circuit readily traced on the drawing. After a short interval of time the flashing relay ZR will have assumed its deenergized position in response to the dropping of control relay Z so that the line circuit through the control relay Z is again completed and the lamp 54 in the dispatcher's officer is again extinguished. This momentary energization and deenergization of lamp 54 is repeated, thus causing flashing of this lamp 54 so long as the lever L remains in one of its extreme positions with the signal relay SR deenergized.

As heretofore mentioned the reverse circuit for the switch machine SM has been completed and the switch machine thus operates the switch 9 to the take-siding position. Upon completion of the operating stroke of the switch machine, the switch box contact 25 and 28 will have assumed the dotted position thus completing a different circuit for the signal relay SR, than the one heretofore traced, which will operate this signal relay SR to the left hand dotted position through a circuit readily traced in the drawing, and including the wire 52 instead of the wire 34. The completion of this circuit causes the neutral contacts 23 and 39 of the signal relay SR to assume the attracted position, in which case the contact 50 of the flashing relay ZR is excluded from the circuit of the relay Z by the lifting of the front contact 23, and the flashing of the lamp 54 in the dispatcher's office DO is discontinued. Also, lifting of contact 39 opens the circuit including the coil 40 of the relay CR, thus saving the energy which would otherwise be lost. The relay CR will of course remain in its last operated position.

It should be noted that the front contact 21 of the detector track relay T is included in the energizing circuit of the control relay Z, from which it will appear that the control relay Z cannot be energized while this contact 21 is down, and for this reason the switch machine cannot be operated when the detector track circuit is occupied. Further, if the control relay Z is energized and the switch machine has already responded thereto the treading of a train on the detector track circuit deenergizes the track delay T thus breaking the circuit for the control relay Z and indicating relay IR, and effecting a continuous illumination of the indicating lamp 54. In other words, the passage of a train over the detector track circuit causes a continuing non-flashing indication in the tower through the medium of lamp 54; whereas the fact that the switch machine assumes an intermediate position, or the fact that the control relay Z is out of step or out of correspondence with the position of the switch machine, is indicated by a continuing flashing indication of the lamp 54.

Attention is called to the fact that there have been shown signal relays NI and RI which are energized if the signal relay SR assumes the normal and the reversed energized positions, respectively. These signal relays NI and RI through contacts 55 and 56 and in conjunction with the home relays 1H and 2H control the indicating conditions of signals 1, $1^d$, 2 and $2^d$. These signal control circuits have been shown by dotted lines, and are believed to be readily understood by those skilled in the art of railway signalling, and need not be specifically traced.

As already mentioned the normal and the reverse circuits for the switch machine SM include a normal cut out relay NC and a reverse cut out relay RC, respectively. These relays are of the latch control type and include contacts 60 and 61, which are biased to an open position by springs 62 and 63. These relays are so designed that if the current flowing therein is excessive, or has been flowing for too long a period of time, the latch 64 or 65 will be operated, thereby causing the normal or reverse circuit, as the case may be, to be permanently broken. If this occurs the switch machine can not be operated in the direction of the circuit of which the cut out relay has functioned, and the switch must be operated back to the original position, and the maintainer is required to investigate this matter and restore the cut out relay manually.

In this connection it is of course understood that if one of these cut out relays is operated before the switch machine completes its stroke, that the indicating lamp 54 is flashed in a manner as already described. Also, it is noted that if the operator in the tower should operate his lever L at a time when the approach locking relay L is deenergized, possibly because there is a train approaching the track switch, that the operator will be immediately advised of this fact by illumination of the lamp 54. This also being true if the detector track circuit is occupied at a time when the lever is operated.

Having thus shown and described one specific embodiment of the invention, and having shown, the same applied to a dispatching system, it is to be understood that this has been done for the purpose of facilitating explanation of the underlying principles of the invention rather than its scope or the particular construction preferably employed in practicing the same, and that various changes, modifications, and additions may be made to adapt the invention to the particular problem encountered in practicing the same and without departing from the spirit or scope of the invention, except as demanded by the scope of the following claims.

What I claim is:—

1. In a system for controlling a distant switch machine and receiving distinctive indications of train progress and switch machine operation; the combination with a distant switch machine for operating a track switch, a control relay at said switch machine for controlling said switch machine, a lever at a local office for controlling said relay, a line circuit connecting said relay and lever, signal means at said office for indicating continuous and intermittent opening of said circuit at the relay end of said line circuit, a detector track circuit associated with said track switch, and means at the relay end of said line circuit for intermittently opening said line circuit so long as the switch machine assumes an intermediate position and for opening said line circuit continuously so long as said detector track circuit is occupied.

2. In a system for controlling a distant switch machine and receiving distinctive indications of train progress and switch machine operation; the combination with a distant switch machine for operating a track switch, a control relay at said switch machine for controlling said switch machine, a lever at a local office for controlling said relay, a line circuit connecting said relay and lever, an indicating lamp at said tower, a detector track circuit associated with said track switch, and means at the relay end of said line circuit acting over said line circuit to flash said lamp so long as the switch machine assumes an intermediate position and to illuminate said lamp constantly so long as said detector track circuit is occupied.

3. In a system for safely controlling a distant switch machine and receiving distinctive indications of train progress and switch machine operation; the combination with a distant switch machine for operating a track switch, an approach locking relay at said switch machine, a control relay at said switch machine for controlling said switch machine only if said approach locking relay is energized, a lever at a local office for controlling said relay, a line circuit connecting said relay and lever, an indicating lamp at said tower, a detector track circuit associated with said track switch, and means at the relay end of said line circuit acting over said line circuit to flash said lamp so long as the switch machine assumes an intermediate position and to illuminate said lamp constantly so long as said detector track circuit is occupied.

4. In a system for controlling switch machines, the combination with a switch machine, a relay of the mechanical stick type for controlling said switch machine, a lever for controlling the energization of the said mechanical stick type relay, and other means for cutting current off of said mechanical stick type relay when said switch machine and said relay assume corresponding positions.

5. In a system for controlling switch machines, the combination with a switch machine, a relay of the mechanical stick type for controlling said switch machine, a lever for controlling the energization of said mechanical stick type relay, an indicating relay assuming an energized condition when said switch machine and said mechanical stick type relay assume corresponding positions, and a back contact on said indicating relay for opening the energizing circuit of said mechanical stick type relay when said indicating relay is energized.

6. Control circuits and devices for controlling a switch machine at and receiving signal indications from a distant control point over a single line circuit comprising, a distant polar control relay, a lever for applying current of one polarity or another to a line circuit connected to said control relay, an indicating device in said circuit near said lever, a switch machine controlled by said control relay, means for intermittently opening said circuit at the control relay end thereof when said switch machine assumes an intermediate position, thus causing said indicating device to give an intermittent indication so long as said switch machine assumes an intermediate position.

7. Control circuits and devices for controlling a switch machine at and receiving signal indications from a distant control point over a single line circuit comprising, a distant polar control relay, a lever for applying current of one polarity or another to a line circuit connected to said control relay, an indicating device in said circuit near said lever, a switch machine controlled by said control relay, and means for intermittently opening said circuit at the control relay end thereof when said switch machine assumes an intermediate position thus causing said indicating device to give an intermittent indication so long as said switch machine assumes an intermediate position, and a cut-out device for opening the control circuit of said switch machine if said switch machine draws an excessive amount of current thus causing said intermittent indication to be continued.

8. Control circuits and devices for controlling a switch machine at and receiving signal indications from a distant control point over a single line circuit comprising, a distant polar control relay, a lever for applying current of one polarity or another to a line circuit connected to said control relay, an indicating device in said circuit near said lever, a switch machine controlled by said control relay, and means for intermittently opening said circuit at the control relay end thereof when said switch machine assumes an intermediate position, thereby causing said indicating device to give an intermittent indication so long as said switch machine assumes an intermediate position, and means for continuously opening said line circuit when a train passes said control point, thereby giving a continuous indication in response to the passage of a train.

9. Control circuits and devices for controlling a switch machine at and receiving signal indications from a distant control point over a single line circuit comprising, a distant polar control relay, a lever for applying current of one polarity or another to a line circuit connected to said control relay, an indicating device in said circuit near said lever, a switch machine controlled by said control relay, and means for intermittently opening said circuit at the control relay end thereof when said switch machine assumes an intermediate position so as to cause said indicating device to give an intermittent indication so long as said switch machine assumes an intermediate position, and a cut-out device for opening the control circuit of said switch machine, if said switch machine draws an excessive amount of current and causing said intermittent indication to be continued, and means for continuously opening said line circuit when a train passes said control point so as to give a continuous indication in response to the passage of a train.

10. Control circuits and devices for controlling a switch machine at and receiving signal indications from a distant control point over a single line circuit comprising; a distant polar control relay; a lever for applying current of one polarity or another to a line circuit connected to said control relay; an indicating device in said circuit near said lever; a switch machine controlled by said control relay; signals associated with said switch machine controlled in accordance with the position of said switch machine, the condition of said control relay and traffic conditions in advance thereof; a detector track circuit associated with the track switch governed by said switch machine; and means for intermittently opening said circuit when the switch machine assumes an intermediate position, and continuously opening said circuit when said detector track circuit is occupied, thereby causing said indicating device to give an intermittent indication when said switch machine assumes an intermediate position and give a continuous indication when said detector track circuit is occupied.

11. In a control system for power-operated switches, the combination with a power-operated switch, of a control relay for governing its operation, indicating means at a distant point, a circuit for said indicating means, and automatic means for intermittently opening and closing said circuit while said switch is in a position out of correspondence with said control relay.

12. In a control and indication system for railroad track switches, a switch machine for operating a track switch, a control relay for governing the operation of said switch machine, a control lever for governing said control relay, and means rendered effective to indicate the position of said track switch only if said switch machine, said control relay and said control lever assume corresponding extreme positions.

13. In a centralized traffic controlling system for railroads, a track switch, a switch machine for operating said track switch, a control lever for governing said switch machine, a polarized indication circuit having a current flowing in one direction therein only when said track switch in one position and said control lever is in correspondence therewith and having current flowing in the opposite direction only when the track switch is in an opposite position and said control lever is in correspondence therewith, but having no current flowing therein when said control lever assumes an intermediate position or assumes an extreme position and said track switch is out of correspondence therewith, and indication means included in said indication circuit.

14. In a centralized traffic controlling system for railroads, a track switch, a switch machine for operating said track switch, a control lever for governing said switch machine, a polarized indication circuit having a current flowing in one direction therein said track switch in one position and said control lever in correspondence therewith and having current flowing in the opposite direction with the track switch in an opposite position and said control lever in correspondence therewith but having no current flowing therein when said control lever and said track switch are either out of correspondence or said control lever assumes an intermediate open-circuit position, a polar neutral relay included in said indication circuit, and signals selected in accordance with said polar neutral relay for governing traffic over said track switch.

15. In combination, a railway switch having normal and reverse positions, a manually operable lever having normal and reverse positions, an indication relay, means for energizing said indication relay when and only when said switch and said lever occupy corresponding positions, and means for preventing operation of said switch unless said relay is deenergized.

16. In combination, a railway switch having normal and reverse positions, a manually operable lever having normal and reverse positions, an indication relay, means for energizing said indication relay when and only when said switch and said lever occupy corresponding positions, and means controlled by a back contact of said indication relay for preventing operation of the switch unless the relay is deenergized.

17. In combination, a railway switch having normal and reverse positions, a manually operable lever having normal and reverse positions, a polarized indication relay, means for supplying said polarized indication relay with current of one polarity when and only when said lever and said switch both occupy their normal positions, means for supplying said polarized indication relay with current of the opposite polarity when and only when said lever and said switch both occupy their reverse positions, and governing means controlled by said polarized indication relay.

18. In combination, a railway switch having normal and reverse positions, a manually operable lever having normal and reverse positions, a polarized indication relay, means for supplying said polarized indication relay with current of one polarity when and only when said lever and said switch both occupy their normal positions, means for supplying said polarized indication relay with current of the opposite polarity when and only when said lever and said switch both occupy their reverse positions, and means effective when said polarized indication relay is deenergized for moving said switch to its normal or its reverse position according as said lever occupies its normal or its reverse position.

19. In combination, a railway switch, a manually operable lever having normal and reverse positions, an indication relay, means effective when said indication relay is deenergized for moving said switch to a normal or a reverse position according as said lever occupies its normal or its reverse position and for preventing movement of the switch unless the relay is deenergized, and means controlled by said lever and by said switch for energizing said indication relay when and only when said lever and said switch occupy corresponding positions.

20. In a control system for switch machines, the combination with a switch machine, a control relay, a repeater relay having its energizing circuit controlled by said control relay and for controlling said switch machine, and a contact in the energizing circuit of said repeater relay open only if said control relay and said switch machine assume corresponding positions.

21. In a control system for switch machines, the combination with a switch machine, a control relay associated with said switch machine, an electro-responsive device for controlling said switch machine and controlled by a circuit including a first contact of said control relay, and a second contact included in said circuit open when said switch machine and control relay assume corresponding positions, whereby said circuit cannot be closed by accidental bridging of said first contact.

22. In a control system for switch machines for railroads, the combination with a switch machine, an electro-responsive device for controlling said switch machine, a control contact for controlling said electro-responsive device and included in a control circuit for said electro-responsive device, and a second contact in said control circuit closed if said control contact and said switch machine assume non-corresponding positions.

23. In combination, a railway switch, controlling apparatus governed from a remote point for causing operations of said switch, an indicating relay controlled by said apparatus and by said switch and energized or deenergized according as the switch does or does not register with the condition of the apparatus, a locking relay, and a circuit which if momentarily closed allows control of said track switch and including a contact controlled by said locking relay and a back contact of said indication relay in series.

24. In combination, a railway switch, controlling apparatus governed from a remote point for causing operations of said switch, an indicating relay controlled by said apparatus and by said switch and energized or deenergized according as the switch does or does not register with the condition of the apparatus, a signal controlling traffic over said switch and also governed from said remote point, and locking means effective to permit operation of said switch only if said signal has been controlled to indicate stop and said indication relay is deenergized.

25. In combination, a railway switch, controlling apparatus governed from a remote point for causing operations of said switch, an indicating relay controlled by said apparatus and by said switch and energized or deenergized according as the switch does or does not register with the condition of the apparatus, a signal controlling traffic over said switch and also governed from said remote point, an approach section located in the rear of such signal, an approach locking relay controlled in part by traffic conditions in said approach section, and a circuit which must be closed momentarily at least to permit control of said track switch and including in series a contact closed only if said approach locking relay assumes one particular condition and a contact of said indication relay closed only if the indication relay assumes its deenergized condition.

26. In combination, a railway switch having normal and reverse positions, a manually operable lever having normal and reverse positions, an indication relay, means for energizing said indication relay when and only when said switch and said lever occupy corresponding positions, means for preventing operation of said switch unless said relay is deenergized, and signals for governing the movement of traffic over said switch controlled by said indication relay.

FRANK L. DODGSON.